United States Patent
Smolen

Patent Number: 5,915,243
Date of Patent: Jun. 22, 1999

[54] METHOD AND APPARATUS FOR DELIVERING CONSUMER PROMOTIONS

[76] Inventor: Daniel T. Smolen, 61 Governors Ave., Millford, Conn. 06460-3439

[21] Appl. No.: 08/705,142

[22] Filed: Aug. 29, 1996

[51] Int. Cl.$^6$ .................................................. G06F 17/60
[52] U.S. Cl. .................................. 705/14; 705/14; 705/1; 705/27; 348/12; 348/13; 379/92.01
[58] Field of Search .................................. 705/1, 14, 27; 348/12, 13; 379/92.01

[56] References Cited

U.S. PATENT DOCUMENTS

| | | |
|---|---|---|
| 3,095,653 | 7/1963 | Corrigan . |
| 3,546,791 | 12/1970 | Koos et al. . |
| 3,599,221 | 8/1971 | Baer . |
| 3,606,688 | 9/1971 | Zawels et al. . |
| 3,671,668 | 6/1972 | Reiffel . |
| 3,810,627 | 5/1974 | Levy . |
| 3,848,082 | 11/1974 | Summers . |
| 3,910,322 | 10/1975 | Hardesty, Jr. et al. . |
| 3,964,179 | 6/1976 | Bennett . |
| 3,993,861 | 11/1976 | Baer . |
| 3,999,307 | 12/1976 | Tsuda et al. . |
| 4,044,380 | 8/1977 | Justice et al. . |
| 4,052,798 | 10/1977 | Tomita et al. . |
| 4,141,548 | 2/1979 | Everton . |
| 4,264,924 | 4/1981 | Freeman . |
| 4,268,744 | 5/1981 | McGeary . |
| 4,271,351 | 6/1981 | Bloodworth . |
| 4,286,323 | 8/1981 | Meday . |
| 4,329,684 | 5/1982 | Monteath et al. . |
| 4,339,798 | 7/1982 | Hedges et al. . |
| 4,377,870 | 3/1983 | Anderson et al. . |
| 4,388,008 | 6/1983 | Greene et al. . |
| 4,541,806 | 9/1985 | Zimmerman et al. . |
| 4,573,072 | 2/1986 | Freeman . |
| 4,592,546 | 6/1986 | Fascenda et al. . |
| 4,593,904 | 6/1986 | Graves . |
| 4,608,601 | 8/1986 | Shreck et al. . |
| 4,611,996 | 9/1986 | Stoner . |
| 4,630,040 | 12/1986 | Haertling . |
| 4,671,772 | 6/1987 | Slade et al. . |
| 4,745,468 | 5/1988 | Von Kohorn . |
| 4,807,031 | 2/1989 | Broughton et al. . |
| 4,833,710 | 5/1989 | Hirashima . |
| 4,876,592 | 10/1989 | Von Kohorn . |
| 4,896,791 | 1/1990 | Smith . |
| 4,907,079 | 3/1990 | Turner et al. . |
| 4,908,761 | 3/1990 | Tai ............................................. 705/14 |
| 4,910,672 | 3/1990 | Off et al. .................................. 705/14 |
| 4,926,255 | 5/1990 | Von Kohorn . |
| 4,926,256 | 5/1990 | Nanba . |

(List continued on next page.)

FOREIGN PATENT DOCUMENTS

| | | |
|---|---|---|
| 1172847 | of 0000 | Canada . |
| 1287304 | of 0000 | United Kingdom . |
| 2120507 | of 0000 | United Kingdom . |

OTHER PUBLICATIONS

R-888-MF Nov. 1971 Interactive Television Prospects for Two-Way Services on Cable by Walter S. Baer.

A page from Sync Catalog titled "Right on schedule . . . it's the 1988 non-stop Holiday Special".

Page #2, Copyright 1988 from Sync Catalog titled "Now you can beat the contestants on TV's most popular game show!".

*Primary Examiner*—Allen R. MacDonald
*Assistant Examiner*—Jagdish Patel
*Attorney, Agent, or Firm*—Graham & James LLP

[57] ABSTRACT

A method and apparatus for offering promotions to a consumer on the basis of a dynamic information profile for that consumer. The dynamic information profile is formed by creating an initial information profile for the consumer, selecting questions for the consumer based on the information profile, presenting the questions to the consumer, collecting the responses to the questions, and updating the information profile using the responses to the questions. Promotions can be offered to a consumer based upon the entire information profile or a portion of the information profile.

7 Claims, 2 Drawing Sheets

U.S. PATENT DOCUMENTS

| | | |
|---|---|---|
| 4,949,256 | 8/1990 | Humble . |
| 4,972,504 | 11/1990 | Daniel, Jr. et al. . |
| 5,034,807 | 7/1991 | Von Kohorn ............................ 348/13 |
| 5,057,915 | 10/1991 | Von Kohorn . |
| 5,063,610 | 11/1991 | Alwadish . |
| 5,111,927 | 5/1992 | Schulze, Jr. . |
| 5,128,752 | 7/1992 | Von Kohorn . |
| 5,227,874 | 7/1993 | Von Kohorn ............................ 705/10 |
| 5,249,044 | 9/1993 | Von Kohorn ............................ 348/12 |
| 5,508,731 | 4/1996 | Kohorn . |
| 5,515,270 | 5/1996 | Weinblatt ................................ 705/14 |
| 5,576,951 | 11/1996 | Lockwood ............................... 705/27 |
| 5,619,558 | 4/1997 | Jheeta .................................. 379/92.01 |
| 5,636,346 | 6/1997 | Saxe ........................................ 705/1 |

METHOD AND APPARATUS FOR DELIVERING CONSUMER PROMOTIONS

BACKGROUND OF THE INVENTION

The invention relates to a method and apparatus for delivering promotions to a person, household or business on the basis of a dynamic information profile for that person, household or business, the dynamic information profile being formed by creating an initial information profile for the person or household, selecting one or more questions based on the information profile, presenting the one or more questions to a person in the household, collecting the responses to the one or more questions, and updating the information profile using the responses to the questions. Promotions can be offered to a person or household based upon the state of the entire information profile or a portion of the information profile.

DESCRIPTION OF RELATED ART

For many years, advertisers and marketers have relied on well-established media channels to promote consumer products and services through coupons, rewards and other offers of perceived value. Such promotional channels include, but are not limited to: newspaper coupon supplements, magazines, cooperative and solo (single advertiser) direct mail packages, in-store displays and coupon dispensers. Despite the fact that these programs employ little, if any, targeting capabilities, advertisers and marketers using them have enjoyed years of satisfactory offer redemption and response, which in many cases has translated into improved sales and profitability. Recently, however, major advertisers have seen their coupon and reward programs, which are executed in such traditional channels, suffer from diminishing response and redemption, partly due to an over-saturation of coupons and offers in the marketplace. Further, the cost of distributing coupons and rewards in these channels has been impacted by increases in paper prices and postage, as well as increasing rates of misredemption and fraudulent use. To overcome these problems, a new channel for product and service promotion that is different from traditional promotion strategies is needed.

U.S. Pat. No. 5,249,044, discloses a method for storing, displaying and dispensing of coupons, wherein a consumer watching a television commercial is enabled to receive a coupon offer redeemable for the item or service promoted. The consumer uses a signaling device (such as a key pad controller for a set-top box) to enter an offer code for the item or service desired and a household identification code. That information is stored, then later transmitted in a data packet to a single broadcast location. Subsequently, a return signal from the single broadcast location generates, via a printer device interfaced with the television and set-top box, a coupon or other reward. This method would enable consumers to self-select preferred rewards for products and services. The method may produce satisfactory response or redemption and help an advertiser achieve higher short term sales. This method, however, suffers from the major drawback that, when successfully employed, it encourages a current consumer of an advertised product or service to receive rewards for a product or service without providing any other incentive for the consumer to buy a product or service absent the reward, thereby merely presenting another media for traditional coupon offering. This effect, known in the consumer promotion industry as "cherry picking" does not necessarily encourage non-users to try the product or service, so the advertiser is unable the increase its share of product category sales and program profitability is threatened.

U.S. Pat. No. 5,034,807, discloses a system for evaluating and rewarding responses and predictions for broadcast transmitted programming, including a reward of coupons and other promotions associated with participation in games of chance or skill. A consumer in a remote location provides answers to a variety of questions relating to household demographics, psychographic or lifestyle attributes, or consumer product or service preferences. While this system relates to a participant's answering of questions or identifying events for which correct answers might be predetermined, this system does not provide or apply to the capture and dissemination of market research data. Also, this system does not address the evaluation of consumer survey information nor does it provide a method of determining a unique household profile. Further, this method does not prepare follow-up questions for a consumer to enhance or modify the unique household profile.

U.S. Pat. No. 4,910,672, describes a method for collecting, at a point-of-sale retail location, a consumer's shopping preferences and providing an immediate reward to the consumer in the form of a redemption coupon good toward a future purchase of a household product, competitive to one purchased in the current transaction or a future purchase of the same product purchased in the current transaction. This system only produces an outcome based upon the products purchased within a given transaction, and does not take into consideration a consumer's cumulative purchase patterns and preferences. Further, this system only addresses activity residing at the point-of-sale, and does not address a consumer's decision-making at other commercial transaction locations.

Other systems have implemented two-way interactive cable television, with a special set-top box and key pad control to enable the subscribers to answer questions posed to an entire viewing audience. Such systems do not facilitate promotion marketing programs nor do they provide for the gathering of user-specific data.

A variety of on-line (Internet and World Wide Web) systems for couponing have begun operation. With these systems, shoppers at remote locations can print coupons and other rewards for redemption from their own printing devices. Such on-line systems, however, attract users from a demographic profile inappropriate to receive or redeem coupons, as such users tend to be young males and teenagers, unlike the target class of coupon users who are, more-typically, female adults. In addition, the possibility of fraudulent usage is high, as no safeguards exist to prevent the dispensing of multiple coupons at a remote location.

SUMMARY OF THE INVENTION

The preferred embodiments of the present invention overcome the problems with the prior art devices described above by providing a method and apparatus for delivering promotions to a person or household on the basis of a dynamic information profile for that person or household, the dynamic information profile being formed by creating an initial information profile for the person or household, selecting one or more questions based on the state of the information profile, presenting the one or more questions to a person in the household, collecting the responses to the one or more questions, and updating the information profile using the responses to the questions. Promotions can be offered to a person or household based upon the state of the entire information profile or a portion of the information profile.

After the answers to the one or more questions are received, the answers are applied to the information profile to generate a new information profile. Each information profile contains demographic information that is used for targeting promotions and coupons by filtering the information for selected marketing criteria. The information profile is used to determine which promotions may be of interest to the person or household it represents, and such promotions may be immediately offered to the person or household, or may be offered to the person or household at a later time by transmitting promotion information to a printing facility.

The preferred embodiments of the present invention thus provide a method for iteratively questioning a household or person to establish an information profile, the profile is then used to establish potential and current market interests, and promotions for such interests are then delivered to the household.

Other features and advantages of the present invention will become apparent from the following description of the preferred embodiments of the present invention which are shown in the accompanying drawings.

DETAILED DESCRIPTION OF PREFERRED EMBODIMENTS

For the purpose of this document, the word display is used in the broadest sense of the word to mean to make perceptible to a person. Display is not herein limited to perception by the visual sense. For example, text can be "displayed" through the use of a text to speech synthesizer that speaks the text. Something can be displayed by using audio, video, Braille, etc.

The preferred embodiments of the present invention are directed to delivering promotions to a person or household. For the purpose of the following explanation and disclosure, the preferred embodiments of the present invention will be described in terms of delivering a promotion to a person. One of ordinary skill in the art will readily see that this invention is readily adaptable to use for a household wherein one or more persons may coexist.

Figure 1:
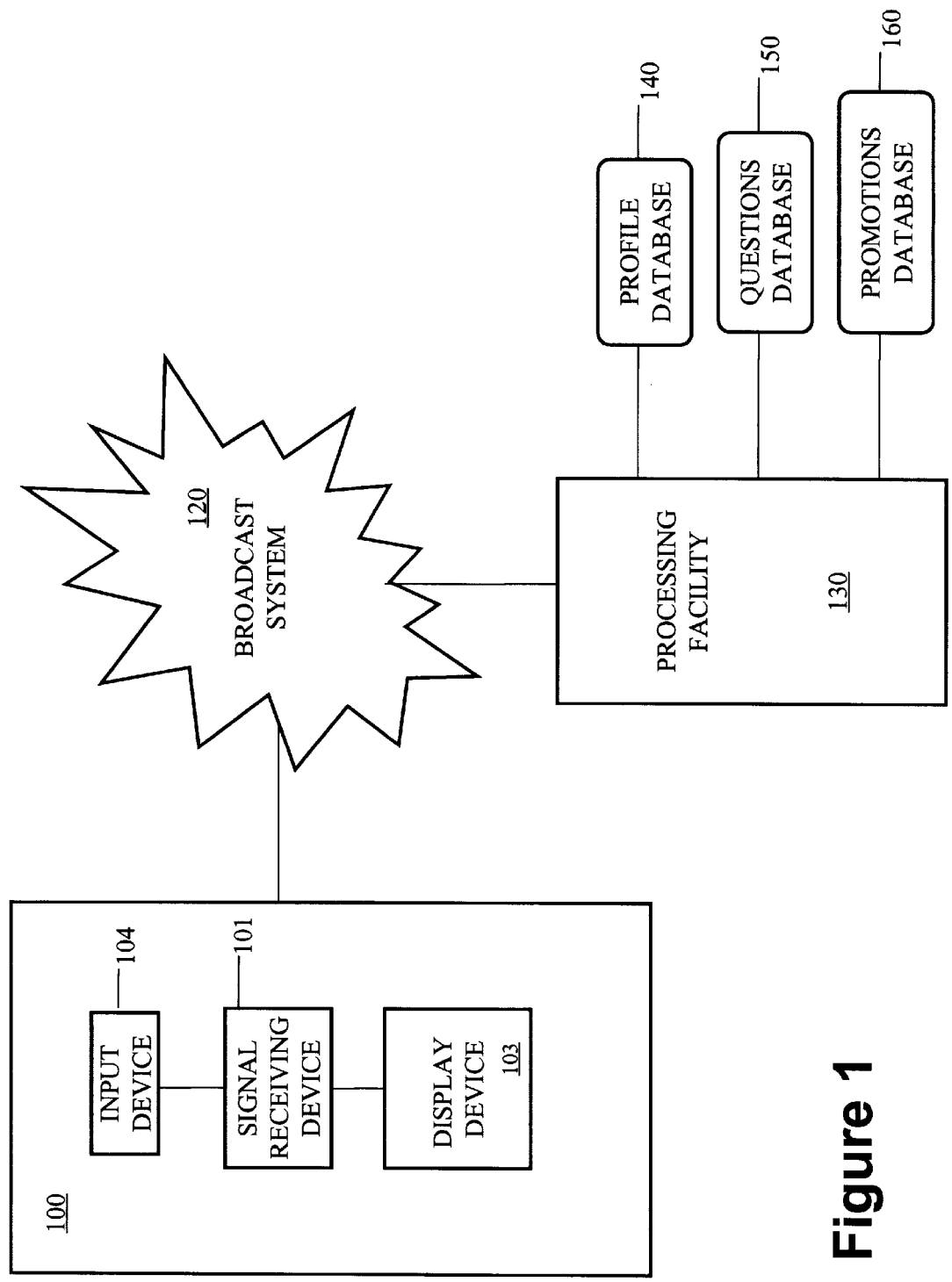
FIG. 1 is a diagram illustrating the system of a preferred embodiment of the invention.

Turning to FIG. 1, a signal tuning device 101, which may be a set-top box having a memory (not shown), is connected to a television 103 and a broadcast system 120. As well known in the art, an input device 104 can be a remote control, and is used to send information to the signal tuning device 101. While preferably a keypad, input device 104 may be a mouse, track-ball, voice activation device, keyboard, or even a touch-screen or other suitable communication device. As is well known in the art, the signal tuning device 101 has the capability to receive ordinary programming as well as data, and display the programming and/or data on the television 103. In addition, the signal tuning device 101 can send data to the broadcast system 120.

A processing facility 130, which may be a computer system operating in a UNIX, Windows NT, IBM PC compatible (i.e., Intel x86), or Apple Macintosh (i.e., Motorola 68000) platform, is also bidirectionally connected to the broadcast system 120. The processing facility 130 has appropriate software for performing many of the following functions. Specifically, the processing facility 130 can accept data forwarded to it from the broadcast system 120, and can route data destined for a signal tuning device 101 through the broadcast system 120. The processing facility has access to a database of information profiles 140, a database of questions 150 and a database of promotions 160. These databases 140, 150, 160 may be stored on any storage device compatible with the processing facility 130.

Figure 2:
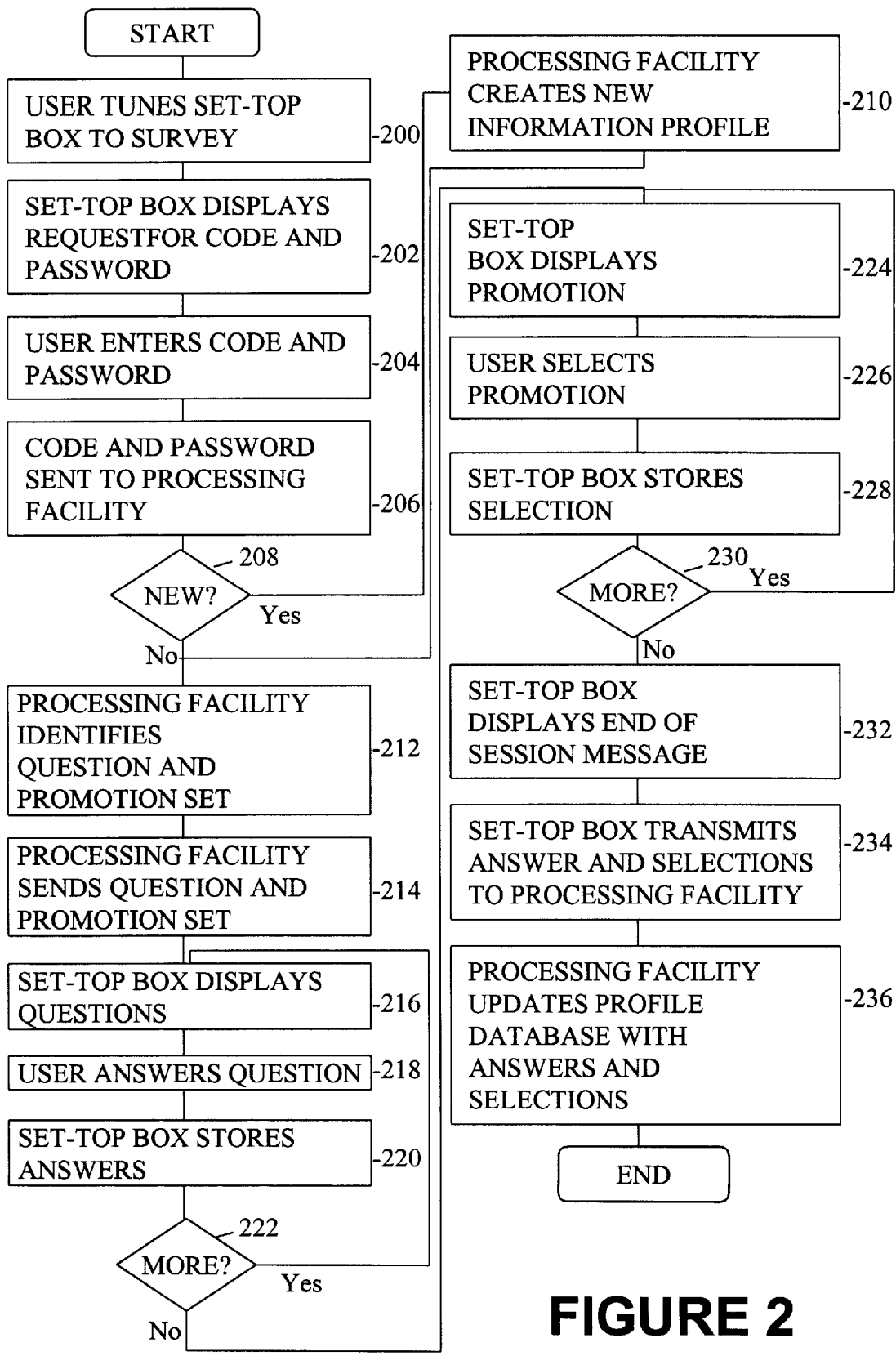
FIG. 2 is flow chart showing a preferred method of carrying out the invention.

Viewing now FIG. 2 in conjunction with FIG. 1, in a preferred embodiment, a person at a remote location 100 may initiate a first survey session by tuning a signal receiving device 101 to a prescribed broadcast signal emitted from a broadcast system 120 (step 200). The signal receiving device 101 then provides the tuned signal to a display device 103. In a preferred embodiment, the signal tuning device 101 is a set-top box, which is connected to television 103 as a display device. In another embodiment, the signal receiving device 101 can be a personal computer and its monitor is the display device 103. The other embodiments, the signal receiving device 101 could be an automated teller machine or any other kiosk.

When the signal tuning device 101 is tuned, the television 103 displays a prompt requesting a code and password (step 202).

In one preferred embodiment, entering a special "new" user code indicates that the user has no code and password, and acts as a request to be assigned a code and password. In such an embodiment, to obtain a code and password, which are required to make further use of the system, the user enters the special "new" user code using the remote control 104. The signal tuning device 101 may determine whether a request for a new code and password is entered, and if so, the request for a code and password is transmitted to the processing facility 130 via the broadcast system 120. Subsequently, the processing facility 130 generates a new code and password and, transmits it to the signal tuning device 101 via the broadcast system 120. The new code and password can be generated using appropriate software in the processing facility 130.

The signal tuning device 101 then causes the new code and password to be displayed on the television 103. The user acknowledges receipt of the code and password with the remote control 104.

In a preferred embodiment, the code and password requested are the user's telephone number and a user-selected personal identification number or PIN. The user may enter the code and password using the remote control 104 (step 204). Any method for verifying a code and password can be used, methods for verifying a code and password are well known in the art. Further, the code and password can be verified by the signal tuning device 101, or the broadcast system 120 or the processing facility 130. In a preferred embodiment, the code and password are transmitted from the input device 104 to the set-up box 101, and then to the processing facility 130 via broadcast system 120 for verification (step 206).

In a preferred embodiment, when the processing facility receives the code and password, it checks to see whether an information profile already exists for it in the profile database 140 for the code and password received (step 208). If no information profile exists, a new information profile is created, stored on the profile database 140, and the new information profile is associated with the received code and password so that the new information profile can later be identified and retrieved using the appropriate code and password (step 210). If the telephone number is used as the code, it is preferably considered part of the information profile because the area-code and exchange make valuable demographic additions to the profile.

Once an information profile is identified or created, one or more questions and promotions will be selected for presentation to the user on the television 103 (step 212). In a preferred embodiment, the processing facility 130 transmits the set of questions and promotions to the signal tuning device 101 for answering and selection (step 214), however, the questions and promotions can be sent one at a time. Similarly, in a preferred embodiment, the answers to the questions and promotion selections are returned to the processing facility 130 at once, instead of one at a time. This process is explained in further detail below.

After identifying or creating an information profile for the code and password, the processing facility 130 retrieves the associated information profile from the profile database 140. The information profile may be a new information profile, or may be a modified information profile, but in either event, the information in the information profile is used to determine the question or questions to ask. A predetermined number of questions will be asked during each survey, which can be one or more, but is preferably between 5 and 15 questions.

The processing facility 130 maintains a question database 150. The question database 150 consists of numerous questions, and profile considerations for posing each question. For example, one question might be: "Does a teen-aged person residing in the household have a driver's license?" Some profile considerations for posing that question may then be: is the questionee a parent; is there a teen-aged person residing in the household; is the teen-ager of driving age, and so on.

The information profile for a user stored in the profile database 140 is retrieved by the processing facility 130 using appropriate software, and a search engine in the processing facility 130 compares the information profile with the profile considerations for posing questions stored in the questions database 150 to find a set of one or more desirable questions. The desirability of questions can be affected by design of the questions profile considerations. The specific considerations for asking questions can be predetermined depending upon the goal of the promotions. In a preferred embodiment, it is often desirable to ask a question that will eliminate the largest and most equal number of other questions regardless of its answer. For example, if the survey were to use yes/no questions, and a questions database contained thousands of questions directed only to males and thousands of others only to females—a question asking for gender is likely to be desirable. Preferably, however, the questions are multiple choice or numeric answer instead of yes/no.

In a preferred embodiment, an information profile contains the answers given by the person in response to questions already posed. Thus, a preferred method of defining profile considerations for asking a question is to identify particular responses to particular questions. Thus, as a simplified example, the question above, "Does a teen-aged person residing in the household have a driver's license?" could have the profile considerations for posing the question that would include the appropriate responses to a question such as number of teens in the household.

The processing facility 130 identifies up to a predetermined number of desirable questions based upon its criteria for selection. In a preferred embodiment, a neural network type system can be used to select questions, taking the information profile as an input and determining the questions to ask as a function of that input. In a preferred embodiment, if more than the number of desirable questions are identified due to a tie for desirability, one or more are selected randomly. Accordingly, even two new profiles having almost identical telephone numbers may not receive the same questions. Similarly, any two profiles containing nearly identical information may or may not receive the same questions.

In a preferred embodiment, the processing facility 130 also maintains a promotions database 160. The promotions database 160 stores numerous promotions, and considerations for offering each promotion. In a manner similar to the way in which questions are selected, the relevance of a promotion to an information profile is determined, and promotions are selected. Here too, in a preferred embodiment, neural network program is used.

In a preferred embodiment, once a set of questions limited to the predetermined number of questions and promotions are identified, the processing facility 130 transmits the questions and promotions to the signal tuning device 101 (step 214).

In a preferred embodiment, the signal tuning device 101 then displays the first question on the television 103 (step 216), and awaits the user's answer. Using input device 104, the user may answer the displayed question (step 218). Preferably, the signal tuning device 101 stores the answer to the users questions in its memory at least until all of the questions have been answered (step 220). After the user responds to the displayed question the survey session may end, but preferably, additional questions are subsequently presented. Accordingly, if the signal tuning device 101 has more questions to ask (step 222), the additional questions may be sequentially displayed on the television 103 (step 216), answered using the input device 104 (step 218), and the answers stored in the memory of the signal tuning device 101 (220). Thus, steps 216–220 may be repeated until no more questions remain unanswered.

Also in a preferred embodiment, the signal tuning device 101 then displays the first promotion on the television 103 (step 224), and awaits the user's selection. Using input device 104, the user may select the displayed promotion (step 226). Preferably, the signal tuning device 101 stores the user's selections in its memory (step 228) at least until they are transmitted to the processing facility (see step 234). After the user responds to the displayed promotion, the survey session may end, but preferably, additional promotions are subsequently presented. Accordingly, if the signal tuning device 101 has more promotions to offer, (step 230), the additional promotions may be sequentially displayed on the television 103 (step 224), selected using the input device 104 (step 226), and the selections stored in a memory of the signal tuning device 101 (step 228). Thus, steps 224–228 may be repeated until no more promotions remain unoffered.

In an alternative preferred embodiment, the user may be offered all of the promotions at once, or be asked to chose between the promotions. In such an embodiment, promotions would still be displayed on the television 103 (step 224), selected by the input device 104 (step 226), and the selections stored in a memory of the signal tuning device 101 (step 228).

Once the questions and promotions are presented and the answers and selections made, the signal tuning device 101 displays an ending message (step 232). The message informs the user that the survey is complete, and tells the user when the promotions can be expected.

The signal tuning device 101 then transmits the answers and selections to the processing facility 130. In a preferred embodiment, the answers are transmitted to the processing facility 130 via the broadcast system 120.

Once the answers and selections are received by the processing facility 130, they are used to update the associated information profile stored on the profile database (step 236). This causes the questions asked and the promotions offered during a subsequent survey session for the user to be affected by the results of the session conducted. This results in the creation of an altered, refined information profile demonstrating the user's unique qualities and providing more specific targeting opportunities for advertisers. Furthermore, this system for creating a profile can change as the needs of the user change.

In an alternative preferred embodiment, the signal tuning device 101 could have a direct connection or may establish a dial-up connection with the processing facility 130. In such an embodiment, the data traveling between the signal tuning device 101 and the processing facility 130 would not require the broadcast system 120 at all. In one preferred embodiment, a personal computer and monitor may comprise the signal tuning device 101 and the display device 103, and the connection between the processing facility 130 and the signal tuning device 101 may be a dial-up connection made with a modem, or any other mode of data transmission, for example an ISDN connection or other data connection (not shown) between the device 101 and the processing facility 130.

As described above, transmission of the answers and selections may take place as the person enters them, but, preferably are stored in the signal tuning device 101 for later transmission, and then transmitted to a processing facility 130 via the broadcast system 120. These answers or selections may also be stored in a memory at the broadcast system 120 and delivered by the broadcast system 120 to the processing facility 130 at a later time. The answers are preferably sent to the processing facility 130 in connection with information identifying the point of origin, which can be the code entered by the user, or, for example, the serial number of the signal tuning device 101.

The preferred method encourages users at remote locations to take part in surveys designed to profile their household's demographics and consumer preferences. It is understood by the user that in exchange for survey compliance, he or she may receive "household-appropriate" offers from advertisers. "Household-appropriate" is defined as an offer which fits a household's unique profile and consumer characteristics.

At any point during the processing of a household profile, participating advertisers can make promotions available in the promotions database 160 with particular selection criteria, i.e., considerations for offering the promotion, which promotions are delivered to users with information profiles meeting certain criteria that the advertiser deemed appropriate for their particular product or service offer. Offers can be fulfilled by a variety of methods including surface mail, electronic mail, key card, or other formats. In one preferred embodiment, the offer can be digitally loaded into an "electronic wallet" and redeemed from the wallet at the point of sale.

A preferred method provides advertisers a way to communicate and reward appropriate households to try, re-try, and ultimately "switch" to their products or services. A preferred method also may be used by an advertiser to reward a current user's loyalty to an advertiser's product or service. This is a feature of significant commercial benefit to advertisers and marketers of consumer products and services.

Although the present invention has been described in relation to particular preferred embodiments thereof, many variations and modifications and other uses will become apparent to those skilled in the art. It is preferred, therefore, that the present invention be limited not by the specific disclosure herein, but only by the appended claims.

What I claim is:

1. A method of offering a promotion to a user, based on information about the user contained in an information profile, and the user and the information profile being identified by a code, the method comprising the steps of:

obtaining the code for the user;

retrieving the information profile of the user identified by the code;

searching a question database comprising a plurality of questions and at least one profile consideration for each of the plurality of questions and selecting a profile consideration based on the information profile;

transmitting the question corresponding to the selected profile consideration to the user;

receiving an answer to the question transmitted to the user;

modifying the information profile based on the answer;

searching a promotions database comprising a plurality of promotions and at least one selection criteria for each of the plurality of promotions and selecting a selection criteria based on the modified information profile; and submitting an offer to the user for the promotion corresponding to a selected selection criteria.

2. A method as claimed in claim 1, further comprising the steps of receiving an acceptance to the offer, and sending to the user a promotion document corresponding to the promotion of the selection criteria.

3. An apparatus for offering a promotion to a user, based on information about the user contained in an information profile, and the user and the information profile being identified by a code, the method comprising the steps of:

means for obtaining the code for the user;

means for retrieving the information profile of the user identified by the code;

means for searching a question database comprising a plurality of questions and at least one profile consideration for each of the plurality of questions and selecting a profile consideration based on the information profile;

means for transmitting the question corresponding to the selected profile consideration to the user;

means for receiving an answer to the question transmitted to the user;

means for modifying the information profile based on the answer;

means for searching a promotions database comprising a plurality of promotions and at least one selection criteria for each of the plurality of promotions and selecting a selection criteria based on the modified information profile; and means for submitting an offer to the user for the promotion corresponding to a selected selection criteria.

4. An apparatus for offering a promotion to a user based on information contained in an information profile, the user and the information profile being identified by a code, the apparatus comprising:

an input device that allows the user to input the code;

a computer system that retrieves the information profile of the user identified by the code from a profile database;

a search engine that searches a question database, the question database comprising a plurality of questions and at least one profile consideration for each of the plurality of questions, search engine selecting a profile consideration based on the information profile;

a transmitter that transmits the question corresponding to the selected profile consideration to the user;

a receiver for receiving an answer to the question transmitted to the user;

updating program for modifying the information profile based on the answer;

a search engine that searches a promotions database, the promotions database comprising a plurality of promotions and at least one selection criteria for each of the plurality of promotions, the search engine selecting a selection criteria based on the modified information profile; and a submitter for submitting an offer to the user for the promotion corresponding to the selected selection criteria.

5. A method of creating and modifying an information profile for a user, the method comprising the steps of:

creating an information profile for the user;

searching a question database comprising a plurality of questions and at least one profile consideration for each of the plurality of questions and selecting a first profile consideration based on the information profile;

transmitting a first question corresponding to the selected first profile consideration to the user;

receiving a first answer to the first question transmitted to the user;

modifying the information profile asked on the first answer to create a modified information profile;

searching the question database and selecting a second profile consideration based the modified information profile;

transmitting a second question corresponding to the selected second profile consideration to the user;

receiving a second answer to second question transmitted to the user; and modifying the modified information profile based on the second answer to create a refined information profile.

6. A method of creating and refining an information profile for a user, the method comprising the steps of:

creating an information profile for the user;

searching a question database comprising a plurality of questions and at least one profile consideration for each of the plurality of questions and selecting a profile consideration based on the information profile;

transmitting a question corresponding to the selected profile consideration to the user;

receiving an answer to the question transmitted to the user; and modifying the information profile based on the answer to create a refined information profile.

7. A method as claimed in claim 6, further comprising the steps of:

searching a promotions database comprising a plurality of promotions and at least one selection criteria for each of the plurality of promotions and selecting a selection criteria based on the refined information profile; and offering to the user the promotion corresponding to a selected selection criteria.

* * * * *